United States Patent
Ichihara et al.

(10) Patent No.: US 11,409,857 B2
(45) Date of Patent: Aug. 9, 2022

(54) RECORDING MEDIUM, INFORMATION PROCESSING METHOD, INFORMATION PROCESSING APPARATUS, AND INFORMATION PROCESSING TERMINAL

(71) Applicant: LINE Corporation, Tokyo (JP)

(72) Inventors: Naohisa Ichihara, Tokyo (JP); Kazunori Sekimizu, Tokyo (JP)

(73) Assignee: Line Corporation, Tokyo (JP)

( * ) Notice: Subject to any disclaimer, the term of this patent is extended or adjusted under 35 U.S.C. 154(b) by 0 days.

(21) Appl. No.: 16/999,278

(22) Filed: Aug. 21, 2020

(65) Prior Publication Data
US 2020/0380110 A1 Dec. 3, 2020

Related U.S. Application Data

(63) Continuation of application No. PCT/JP2018/006375, filed on Feb. 22, 2018.

(51) Int. Cl.
*G06K 5/00* (2006.01)
*G06F 21/40* (2013.01)
(Continued)

(52) U.S. Cl.
CPC .............. *G06F 21/40* (2013.01); *G06F 21/32* (2013.01); *H04L 63/0853* (2013.01); *H04L 63/0861* (2013.01); *H04W 12/63* (2021.01)

(58) Field of Classification Search
CPC .. G06Q 2220/00; G06Q 20/405; G06Q 40/02; G06Q 20/20; H04L 63/0861; H04L 63/083
(Continued)

(56) References Cited

U.S. PATENT DOCUMENTS 5,357,563 A * 10/1994 Hamilton ............... G06Q 20/04
  235/380
5,745,555 A *  4/1998 Mark ..................... G07F 7/0886
  379/93.03
(Continued)

FOREIGN PATENT DOCUMENTS

| JP | 2012-506594 A | 3/2012 |
| JP | 2014-063392 A | 4/2014 |
| JP | 2017-526995 A | 9/2017 |

OTHER PUBLICATIONS

International Search Report PCT/ISA/210 for International Application No. PCT/JP2018/006375 dated May 22, 2018.
(Continued)

*Primary Examiner* — Daniel St Cyr
(74) *Attorney, Agent, or Firm* — Harness, Dickey & Pierce, PLC

(57) ABSTRACT

A non-transitory computer-readable recording medium having computer-readable instructions stored thereon, which when executed, cause an information processing apparatus including a memory and processing circuitry, to execute a method including managing a first account and a second account for a service provided by the information processing apparatus, registering a second user corresponding to the second account as a user capable of recovering the first account, in response to receiving a request from a first information processing terminal corresponding to a first user corresponding to the first account, determining whether authentication is successful based on authentication information of the first user received from a second information processing terminal corresponding to the second user, and providing the first user access to the service based on the determination.

12 Claims, 14 Drawing Sheets

(51) Int. Cl.
   *G06F 21/32*   (2013.01)
   *H04L 9/40*    (2022.01)
   *H04W 12/63*   (2021.01)

(58) Field of Classification Search
   USPC ........................................ 235/380, 382, 492
   See application file for complete search history.

(56) References Cited

U.S. PATENT DOCUMENTS

| | | | | |
|---|---|---|---|---|
| 5,963,647 | A * | 10/1999 | Downing | G06Q 20/04 |
| | | | | 235/379 |
| 5,971,272 | A * | 10/1999 | Hsiao | G06F 21/31 |
| | | | | 235/375 |
| 6,064,990 | A * | 5/2000 | Goldsmith | G06Q 20/04 |
| | | | | 235/379 |
| 2010/0100945 | A1 | 4/2010 | Ozzie et al. | |
| 2014/0090015 | A1 | 3/2014 | Fuse et al. | |
| 2016/0006734 | A1 | 1/2016 | Huang | |
| 2017/0163615 | A1 | 6/2017 | Ho et al. | |

OTHER PUBLICATIONS

Written Opinion for International Application No. PCT/JP2018/006375 dated May 22, 2018.
Japanese Office Action dated Mar. 8, 2022 issued in corresponding Japanese Appln. No. 2020-501915.

* cited by examiner

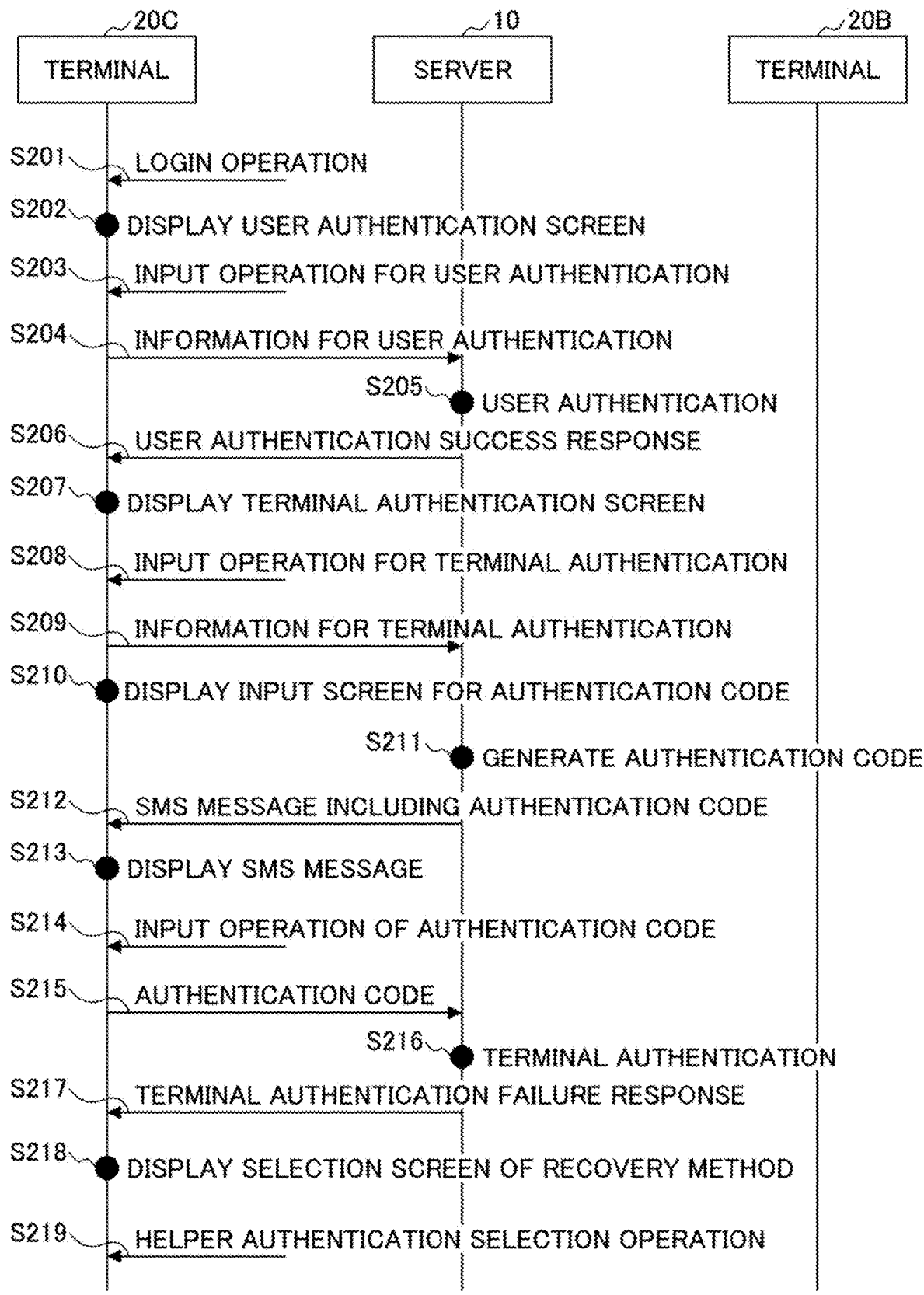

FIG.8

| USER ID | PASSWORD | EMAIL ADDRESS | TELEPHONE NUMBER | TERMINAL ID | USER ID OF HELPER | USER ID OF FRIENDS | SERVICE USAGE HISTORY |
|---|---|---|---|---|---|---|---|
| USER A | PASSWORD A | EMAIL ADDRESS A | TELEPHONE NUMBER A | TERMINAL A | USER B, USER F, ... | USER B, USER C, USER D, ... | SERVICE USAGE HISTORY A |
| ... | ... | ... | ... | ... | ... | ... | ... |

151

RECORDING MEDIUM, INFORMATION PROCESSING METHOD, INFORMATION PROCESSING APPARATUS, AND INFORMATION PROCESSING TERMINAL

CROSS-REFERENCE TO RELATED APPLICATIONS

This U.S. non-provisional application is a continuation application of, and claims the benefit of priority under 35 U.S.C. § 365(c) from, PCT International Application PCT/JP2018/006375 filed on Feb. 22, 2018, which designated the U.S., the entire content of which is incorporated herein by reference.

BACKGROUND

Field

The present disclosure relates to a recording medium, an information processing apparatus method, an information processing apparatus, and an information processing terminal.

Description of Related Art

Conventionally, for a server providing various kinds of services to users' terminals via a network, there is a technique for authenticating a user based on a user ID, a password, and the like, when the user logs in to a service provided by the server.

Further, there is known a technique for performing a two-step authentication (two-factor authentication) based on an authentication code (security code) and the like transmitted from the server as an SMS (Short Message Service), an e-mail, or the like, in addition to the authentication based on the user ID, the password, and the like, in order to improve the security.

SUMMARY

According to some example embodiments of the present disclosure, a non-transitory computer-readable recording medium has computer-readable instructions stored thereon, which when executed, cause an information processing apparatus including memory and processing circuitry, to execute a method including managing a first account and a second account for a service provided by the information processing apparatus, registering a second user corresponding to the second account as a user capable of recovering the first account, in response to receiving a request from a first information processing terminal corresponding to a first user corresponding to the first account, determining whether authentication is successful based on authentication information of the first user received from a second information processing terminal corresponding to the second user, and providing the first user access to the service based on the determination.

BRIEF DESCRIPTION OF DRAWINGS

FIG. 5A is a sequence diagram illustrating an example of an account recovery process of the communication system according to the example embodiments of the present disclosure.

FIG. 8 is a figure illustrating an example of account data according to the example embodiment of the present disclosure.

DETAILED DESCRIPTION

In a conventional technique, there is a problem in that, for example, due to a change of a telephone number, a change of an email address, or the like, two-step authentication cannot be performed, and the user may be unable to log in to the account.

The present disclosure has been made in view of the above issues, and it is an object to provide a technique for reducing or preventing a situation where the user is unable to log in to the account.

<Observance of Legal Matters>

It should be noted that the disclosure described in the present specification assumes compliance with the laws of the jurisdiction required in any country where the subject matter of the present disclosure is implemented, such as the confidentiality of communication.

An example embodiment of a recording medium, an information processing apparatus, an information processing terminal, and an information processing method according to the present disclosure will be explained with reference to drawings.

<System Configuration>

Figure 1:
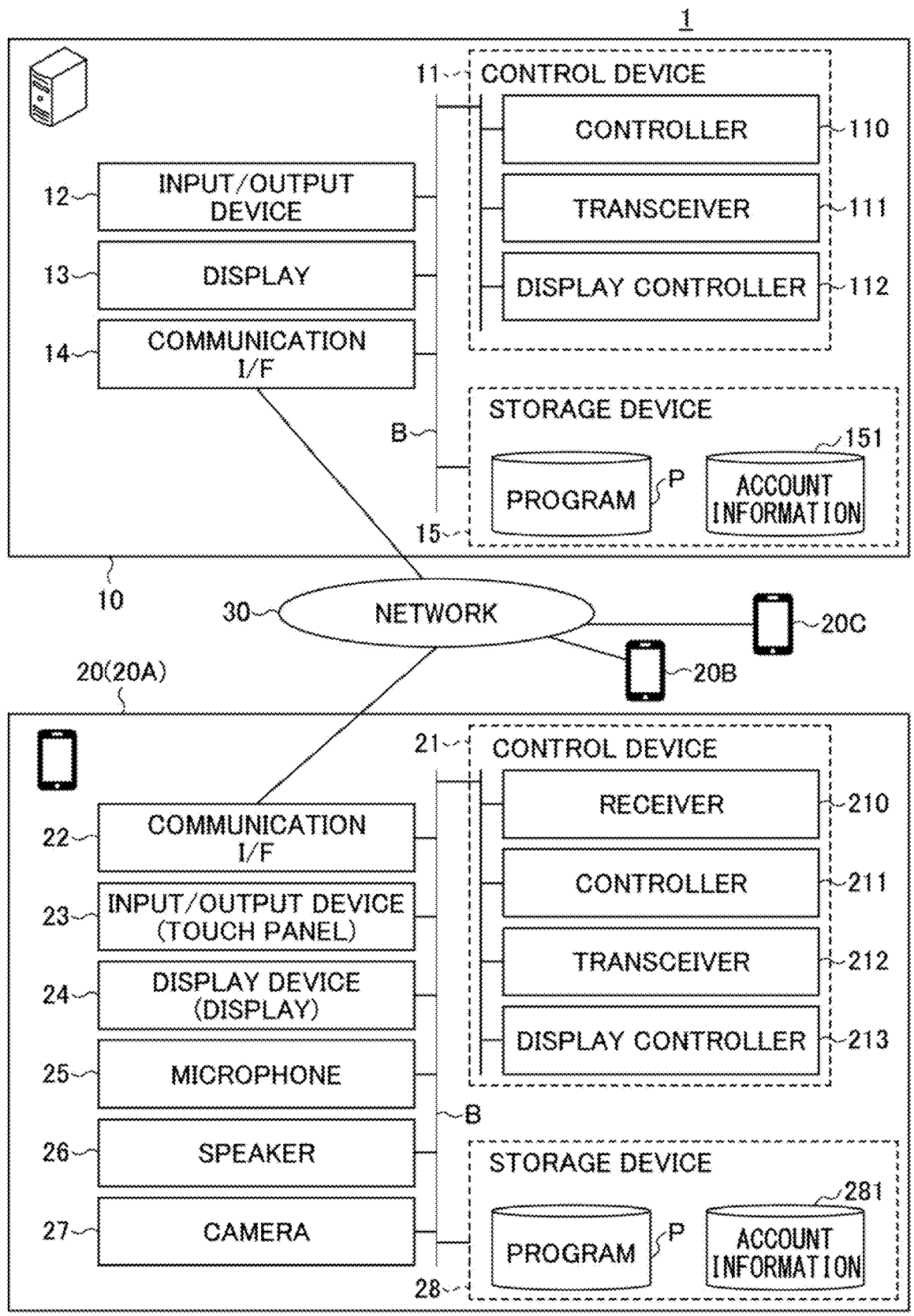
FIG. 1 is a figure illustrating a configuration of a communication system according to some example embodiments of the present disclosure.

FIG. 1 illustrates a configuration of a communication system 1 according to some embodiments of the present disclosure. As disclosed in FIG. 1, in the communication system 1, a server 10, terminals 20 (a terminal 20A, a terminal 20B, and a terminal 20C) are connected via a network 30. The server 10 provides a service that implements transmission and reception of messages between the terminals 20 to a terminal 20 used by a user via the network 30. Note that the number of terminals 20 connected to the network 30 is not limited.

The network 30 plays a role of connecting one or more terminals 20 with one or more servers 10. In other words, the network 30 means a communication network that provides a connection path through which a terminal 20 can transmit and receive data after connecting to a server 10.

One or more parts of the network 30 may be a wired network and/or a wireless network. The network 30 may include, by way of example but not as a limitation, an ad hoc network, an intranet, an extranet, a virtual private network (VPN), a local area network (LAN), a wireless LAN (WLAN), a wide area network (WAN), a wireless WAN (WWAN), a metropolitan area network (MAN), a part of the Internet, a part of a public switched telephone network (PSTN), a mobile phone network, integrated service digital networks (ISDNs), wireless LANs, long term evolution (LTE), code division multiple access (CDMA), Bluetooth (registered trademark), satellite communication, and a combination of two or more of these. The network 30 may also include one or more networks.

The terminal 20 (terminal 20A, terminal 20B, or terminal 20C) may be any terminal as long as it can implement functions described in the embodiment. The terminals 20 may include, by way of example but not as a limitation, a smart phone and may also be a mobile phone (feature phone), a computer (by way of example but not as a limitation, a desktop-type, a laptop-type, a tablet-type, etc.), a media computer platform (by way of example but not as a limitation, a cable/satellite TV set-top box, a digital video recorder, etc.), a handheld computing device (by way of example but not as a limitation, a PDA (personal digital assistant), an e-mail client, etc.), a wearable terminal (a glasses-type device, a watch-type device, etc.), and/or any other type of a computer or a communication platform. The terminal 20 may be expressed as an information processing terminal.

The configurations of the terminal 20A, the terminal 20B, and the terminal 20C are basically the same. Therefore, in the following description, any of these may be referred to as the terminal 20. Note that user information is information on a user associated with an account used by the user in a desired (or alternatively, predetermined or given) service.

The user information includes information associated with the user that is entered by the user or given by the desired (or alternatively, predetermined or given) service, and includes, by way of example but not as a limitation, a name of the user, an icon (moving image) of the user, the age of the user, the gender of the user, an address of the user, a hobby of the user, and an identifier of the user, and the like, or any one or a combination of these.

The server 10 has a function of providing a desired (or alternatively, predetermined or given) service to the terminal 20. The server 10 may be any type of information processing apparatus as long as it can implement functions described in the embodiment. The server 10 may include, by way of example but not as a limitation, a server device, a computer (e.g., a desktop-type, a laptop-type, a tablet-type, etc.), a media computer platform (by way of example but not as a limitation, a cable/satellite TV set-top box, a digital video recorder, etc.), a handheld computing device (by way of example but not as a limitation, a PDA (personal digital assistant), an e-mail client, etc.), or any other type of a computer or a communication platform. The server 10 may be expressed as an information processing apparatus. In the case where it is not necessary to distinguish a server 10 and a terminal 20, the server 10 or the terminal 20 may be referred to as an information processing apparatus.

<Hardware (HW) Configuration>

With reference to FIG. 1, a HW configuration of each device included in the communication system 1 will be described.

(1) HW Configuration of Terminal

The terminal 20 includes a control device 21 (a CPU: Central Processing Unit), a storage device 28, a communication I/F 22 (an interface), an input/output device 23, a display device 24, a microphone 25, a speaker 26, and a camera 27. These elements of the HW of the terminal 20 are connected to each other, by way of example but not as a limitation, via a bus B.

The communication I/F 22 transmits and receives various items of data via the network 30. The communication may be executed by wire and/or by radio, and any communication protocol may be used as long as mutual communication can be executed. The communication I/F 22 has a function of performing communication with the server 10 via the network 30. The communication I/F 22 transmits various items of data to the server 10 according to a command from the control device 21. Also, the communication I/F 22 receives various items of data transmitted from the server 10 and transfers the received data items to the control device 21.

The input/output device 23 includes a device for inputting various operations on the terminal 20 and a device for outputting processed results processed on the terminal 20. The input/output device 23 may have an input device and an output device integrated, or have an input device and an output device separated.

The input device is implemented by any one of all types of devices or a combination of these devices that can receive input from the user and transmit information related to the input to the control device 21. The input device includes, by way of example but not as a limitation, a touch panel, a touch display, hardware keys such as a keyboard or the like, a pointing device such as a mouse, a camera (operation input via moving images), and/or a microphone (operation input by voice).

The output device is implemented by any one or a combination of all types of devices capable of outputting processed results processed by the control device 21. The output device includes, by way of example but not as a limitation, a touch panel, a touch display, a speaker (audio output), a lens (by way of example but not as a limitation, 3D (three dimensional) output or hologram output), a printer, and the like.

The display device 24 is implemented by any one of all types of devices or a combination of these that can execute displaying according to display data written in a frame buffer. The display device 24 includes, by way of example but not as a limitation, a touch panel, a touch display, a monitor (by way of example but not as a limitation, a liquid crystal display or an OELD (organic electroluminescence display)), a head-mounted display (HMD), projection mapping, hologram, or a device that is capable of displaying images, text information, and the like in the air or the like (which may be a vacuum). Note that these display devices 24 may be capable of displaying display data in 3D.

In the case where the input/output device 23 is a touch panel, the input/output device 23 and the display device 24 may have substantially the same size and shape to be arranged to face each other.

The control device 21 has a circuit that is physically structured to execute functions implemented by codes or instructions included in a program, and is implemented by, by way of example but not as a limitation, a data processing device built in the hardware.

The control device 21 includes, by way of example but not as a limitation, a central processing unit (CPU), and also may be a microprocessor, a processor core, multiprocessors, an ASIC (application-specific integrated circuit), or an FPGA (field programmable gate array).

The storage device 28 has a function of storing various programs and various items of data for operation of the terminal 20. The storage device 28 includes, by way of example but not as a limitation, various storage media such as an HDD (hard disk drive), an SSD (solid state drive), a flash memory, a RAM (random access memory), a ROM (read-only memory), and the like.

In the terminal 20, a program P is stored in the storage device 28, and the control device 21 running this program P executes processes corresponding to respective functional units included in the control device 21. In other words, the program P stored in the storage device 28 implements the functions executed by the control device 21 on the terminal 20.

The microphone 25 is used for inputting audio data. The speaker 26 is used for outputting audio data. The camera 27 is used for obtaining data of moving images.

(2) HW Configuration of Server

The server 10 includes a control device 11 (a CPU), a storage device 15, a communication I/F 14 (an interface), an input/output device 12, and a display 13. These elements of the HW of the server 10 are mutually connected, by way of example but not as a limitation, via a bus B.

The control device 11 has a circuit that is physically structured to execute functions implemented by codes or instructions included in a program, and is implemented by, by way of example but not as a limitation, a data processing device built in the hardware.

The control device 11 is typically a central processing unit (CPU), and may be a microprocessor, a processor core, multiprocessors, an ASIC, or an FPGA. However, in the present disclosure, the control device 11 is not limited to these in the present disclosure.

The storage device 15 has a function of storing various programs and various items of data for operation of the server 10. The storage device 15 is implemented by various storage media such as an HDD, an SSD, a flash memory, and the like. However, in the present disclosure, the storage device 15 is not limited to these.

The communication I/F 14 transmits and receives various items of data via the network 30. The communication may be executed by wire and/or by radio, and any communication protocol may be used as long as mutual communication can be executed. The communication I/F 14 has a function of executing communication with the terminal 20 via the network 30. The communication I/F 14 transmits various items of data to the terminal 20 according to an instruction from the control device 11. Also, the communication I/F 14 receives various items of data transmitted from the terminal 20, and transmits the data to the control device 11.

The input/output device 12 is implemented by a device that inputs various operations on the server 10. The input/output device 12 is implemented by any one of all types of devices or a combination of these devices that can receive input from the user and can transmit information related to the input to the control device 11. The input/output device 12 is typically implemented by hardware keys represented by a keyboard or the like, a pointing device such as a mouse, and the like. Note that the input/output device 12 may include, by way of example but not as a limitation, a touch panel, a camera (operation input via moving images), and/or a microphone (operation input by voice). However, in the present disclosure, the input/output device 12 is not limited to these.

The display 13 is typically implemented by a monitor (by way of example but not as a limitation, a liquid crystal display or an OELD (organic electroluminescence display)). Note that the display 13 may be a head-mounted display (HMD) or the like. Note that these displays 13 may be capable of displaying display data in 3D. However, in the present disclosure, the display 13 is not limited to these.

In the server 10, the program P is stored in the storage device 15, and the control device 11 running this program P executes processes corresponding to respective functional units included in the control device 11. In other words, the program P stored in the storage device 15 implements the functions executed by the control device 11 on the server 10.

Each embodiment in the present disclosure will be described assuming that it is implemented by the CPU(s) of the terminal 20 and/or the server 10 executing the program P.

The control device 21 of the terminal 20 and/or the control device 11 of the server 10 may be implemented not only by a CPU but also by processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), a dedicated circuit formed in an integrated circuit (IC) chip, an LSI (Large-Scale Integration) chip, or the like. Also, these circuits may be implemented by one or more integrated circuits, and multiple processes described in the embodiment may be implemented by a single integrated circuit. LSI may also be referred to as VLSI, super LSI, ultra LSI, or the like depending on the degree of integration.

The program P (software program/computer program) of the embodiments in the present disclosure may be provided in a state stored in a computer-readable recording medium. The recording medium can store the program in a "non-transitory tangible medium."

When appropriate, the recording medium may include one or more semiconductor-based or other integrated circuits (ICs) (by way of example but not as a limitation, field programmable gate arrays (FPGAs) or application specific integrated circuits (ASICs)), a hard disk drive (HDD), a hybrid hard drive (HHD), an optical disk, an optical disk drive (ODD), a magneto-optical disk, a magneto-optical drive, a floppy diskette, a floppy disk drive (FDD), a magnetic tape, a solid state drive (SSD), a RAM drive, a secure digital card or drive, any other suitable recording medium, or any suitable combination of two or more of these. When appropriate, the recording medium may be volatile, non-volatile, or may have a combination of volatility and non-volatility. Note that the recording medium is not limited to these examples, and may be any device or medium as long as it can store the program P.

The server 10 and/or the terminal 20 can read the program P stored in the recording medium and execute the read program P to implement the functions of multiple functional units described in each embodiment.

The program P in the present disclosure may be provided to the server 10 or the terminal 20 via any transmission medium (a communication network, a broadcasting wave, or the like) capable of transmitting the program. The server 10 and/or the terminal 20 implement functions of multiple functional units described in the respective example embodiments by executing the program P downloaded via, by way of example but not as a limitation, the Internet or the like.

Each embodiment in the present disclosure can also be implemented in a form of a data signal embedded in a carrier wave in which the program P is embodied by electronic transmission. At least part of the processes executed on the server 10 and/or the terminal 20 may be implemented by cloud computing constituted with one or more computers.

At least part of the processes executed on the terminal 20 may be executed on the server 10. In this case, the server 10 may be configured to perform at least part of processing executed by the functional units of the control device 21 of the terminal 20.

The terminal 20 may be configured to perform at least part of processing executed on the server 10. In this case, the server 10 may be configured to perform at least part of processing executed by the functional units of the control device 11 of the terminal 20.

Unless explicitly mentioned otherwise, in an example embodiment in the present disclosure, a determination is not configured to be mandatory, and desired (or alternatively, predetermined or given) processing may be performed if the determination condition is satisfied or desired (or alternatively, predetermined or given) processing may be performed if the determination condition is not satisfied.

Note that a program in the present disclosure is implemented using, by way of example but not as a limitation, a scripting language such as ActionScript or JavaScript (registered trademark), an object-oriented language such as Objective-C or Java (registered trademark), a markup language such as HTML5, or the like.

Example Embodiment

According to an example embodiment of the present disclosure, authentication information of a first user of a first account is input to a second terminal operated by a second user of a second account selected by the first user of the first account, and when authentication using the authentication information of the first user of the first account is successful on the second terminal, a login with the first account is permitted on the first terminal of the first user of the first account.

<Functional Configuration>

(1) Functional Configuration of Terminal

As illustrated in FIG. 1, the terminal 20 stores account information 281 that includes data related to the user of the terminal 20 in the storage device 28. The account information 281 includes, for example, only the data related to the user of the terminal 20, among data of users of the respective terminals included in account information 151 stored on the server 10.

As illustrated in FIG. 1, the terminal 20 includes a receiver 210, a controller 211, a transceiver 212, and a display controller 213, as functional units implemented by the control device 21.

The receiver 210 receives various operations from the user of the terminal 20. The receiver 210 receives, for example, an operation for selecting a helper, an operation for approving of becoming a helper, and the like. In this case, in a situation where a first user having a first account is unable to log in by using the first account, the helper means a second user having a second account who is capable of recovering the first account.

Also, "recovering an account" means that, in a case where, for example, a user is unable to log in with the user's account due to various reasons due to the user explained below, the user is permitted to log in with the user's account again. It should be noted that the following cases are examples of situations where the user is unable to log in with the user's account. However, the situation where it is impossible to log in, which is the subject of the present disclosure, is not limited to the following cases.

First case: a user forgets a password and the like for the user's account.

Second case: a system is assumed in which, in a case where the user forgets the user's password and the like, the password and the like or a URL (Uniform Resource Locator) for resetting the password is sent to an email address registered in advance in association with the account. In this system, the second case is that, the user is unable to read the email sent to the email address because, e.g., the user has already cancelled the service providing the email address or the user forgets the password for accessing the email address.

Third case: in a system that implements two-step authentication based on a terminal ID in addition to authentication based on the user ID, the password, and the like, the terminal ID of the user's terminal has been changed because, e.g., the user bought a new terminal or the user has reset the OS (Operating System) of the terminal.

Fourth case: in a system in which, if the terminal ID has been changed, an authentication code is sent by an SMS message and the like to the cellphone number to perform authentication by using the authentication code, the user's terminal is unable to receive the SMS because, e.g., the user has cancelled the cellphone service.

Fifth case: a system is assumed in which, if a predetermined (or alternately given) transfer operation is performed on an old terminal and an authentication based on the user ID, the password, and the like is successful on a new terminal within a predetermined (or alternately given) period of time since the predetermined (or alternately given) transfer operation was performed on the old terminal, a two-step authentication based on the terminal ID and the like of the new terminal is performed on subsequent logins. In this system, the fifth case is that the user is unable to perform the predetermined (or alternately given) transfer operation on the old terminal because the user has, e.g., lost, discarded, or sold the old terminal before the user performs the predetermined (or alternately given) transfer operation.

For example, the controller 211 performs processing for registering a helper selected by the user of the terminal 20 to the server 10 and various kinds of processing for recovering an account using the helper. Also, for example, the controller 211 performs various kinds of processing for recovering an account of another user for whom the user of the terminal 20 serves as a helper.

Also, for example, the controller 211 performs various kinds of processing for using an instant messaging service of an SNS (Social Networking Service) provided by the server 10.

The transceiver 212 transmits and receives various contents with the other terminals 20 via the server 10 in a group that includes multiple users. Also, the transceiver 212 performs communication for logging in to the server 10.

The display controller 213 controls displaying on the screen of the terminal 20 according to a command from the controller 211 or the display controller 112 of the server 10.

(2) Functional Configuration of Server

As illustrated in FIG. 1, the server 10 stores the account information 151 that includes data related to the user of each or one or more terminal 20 in the storage device 15. Data stored in the account information 151 will be described later.

As illustrated in FIG. 1, the server 10 has a controller 110, a transceiver 111, and a display controller 112, as functional units implemented by the control device 11.

For example, the controller 110 stores and manages accounts of multiple users in the account information 151 of the storage device 15. Also, for example, in response to an operation of a user of a certain account, the controller 110 performs processing to register a user of a helper for the certain account. Also, for example, in a case where authentication is successful on the basis of authentication information of the user of the certain account that is input to the terminal 20 of the helper for the certain account, the controller 110 performs processing to permit the user of the certain account to log in.

Also, for example, the controller 110 performs various kinds of processing for providing services such as an instant messaging service of an SNS to the terminal 20 of the user of the account. According to instructions of the controller 110, the transceiver 111 transmits and receives various kinds of data for the recovery of accounts and the like to and from the terminal 20. Also, by the instant messaging service and the like, the transceiver 111 transfers contents such as messages, stamps, moving images, and/or audio received from the terminal 20 in a group that includes multiple users.

According to instructions of the controller 110, the display controller 112 displays, on the screen of the terminal 20, various kinds of display screens for recovering the account and the like.

<Helper Registration Process>

Figure 2:
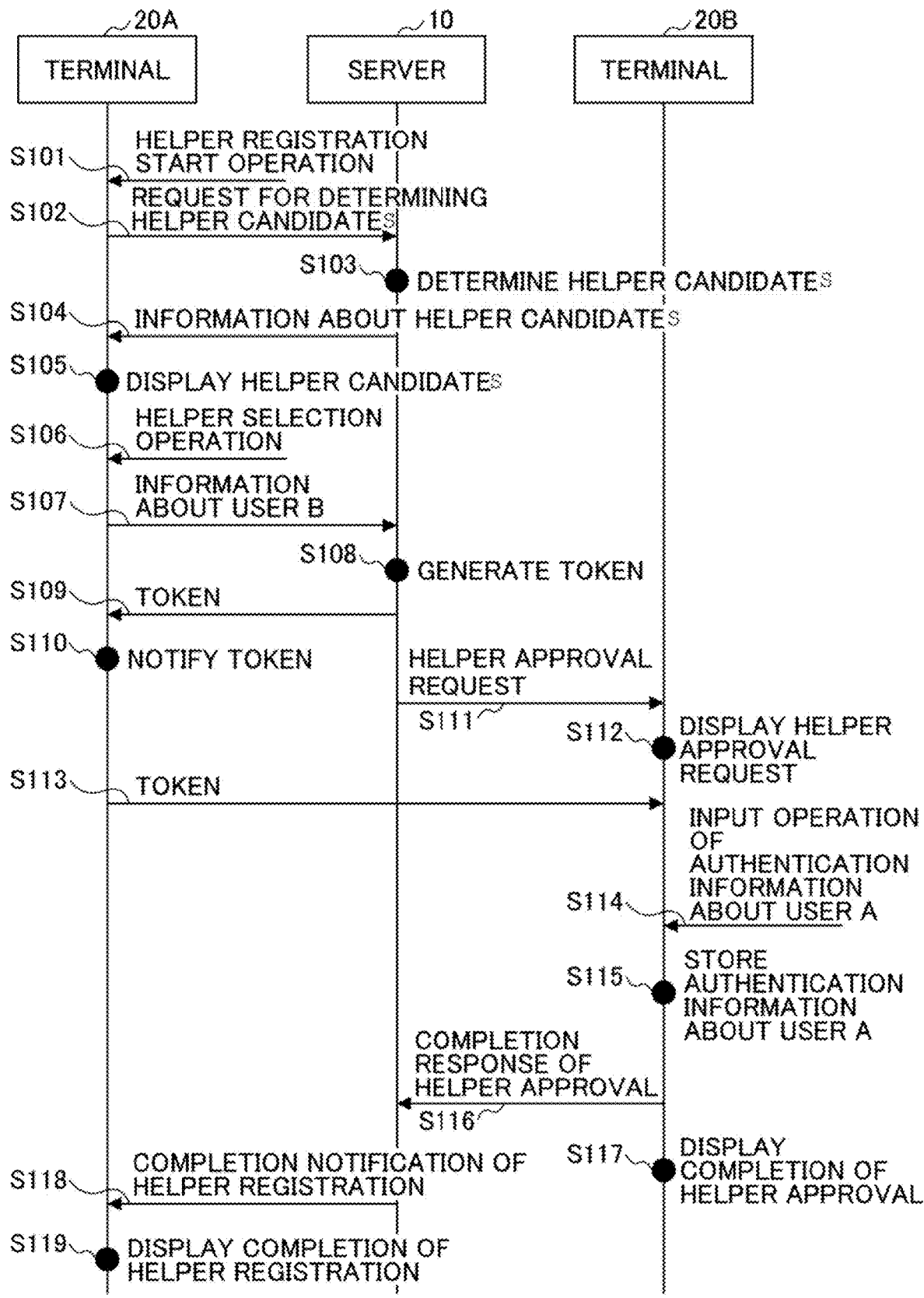
FIG. 2 is a sequence diagram illustrating an example of a helper registration process of the communication system according to some example embodiments of the present disclosure.
Figure 3A:
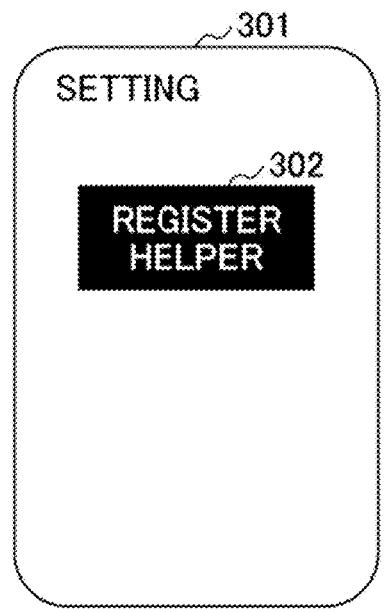
FIG. 3A is a figure for explaining a display screen of a terminal of a user A who requests helper registration.
Figure 3B:
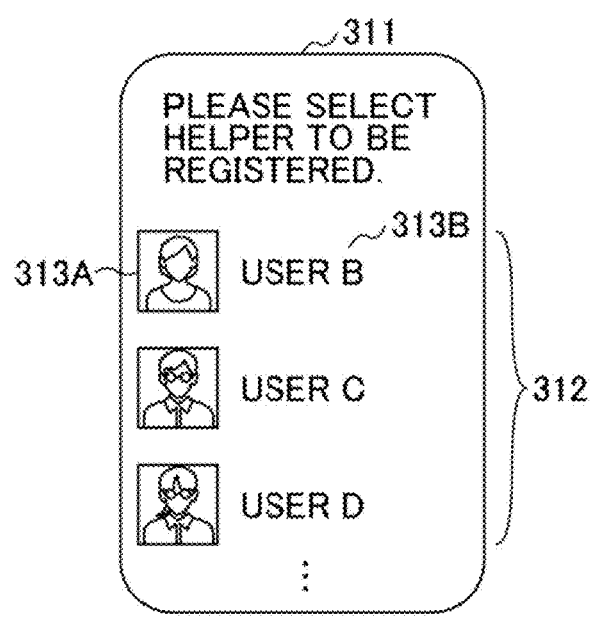
FIG. 3B is a figure for explaining a display screen of the terminal of the user A who requests helper registration.
Figure 3C:
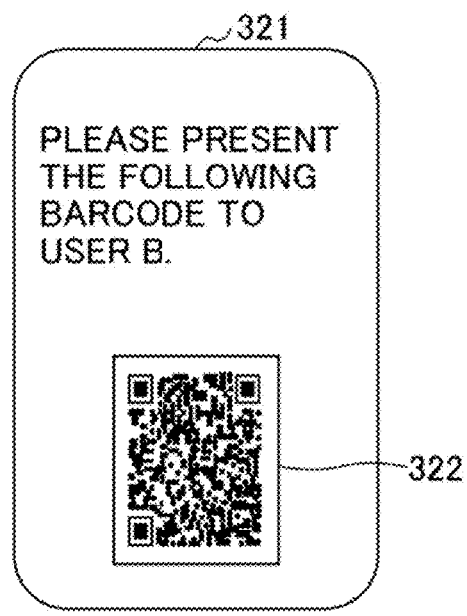
FIG. 3C is a figure for explaining a display screen of the terminal of the user A who requests helper registration.
Figure 3D:
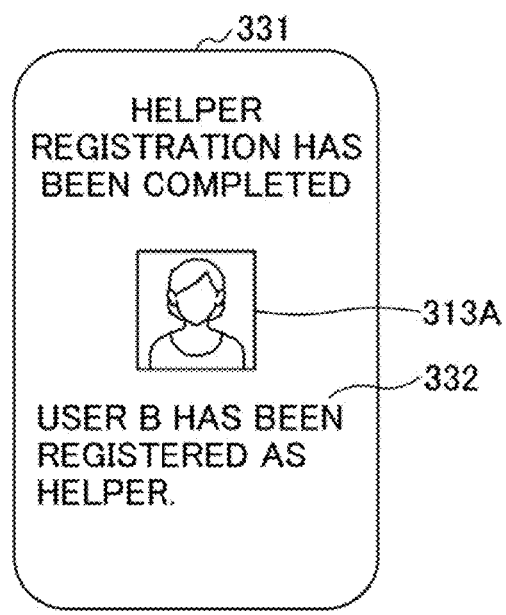
FIG. 3D is a figure for explaining a display screen of the terminal of the user A who requests helper registration.
Figure 4A:
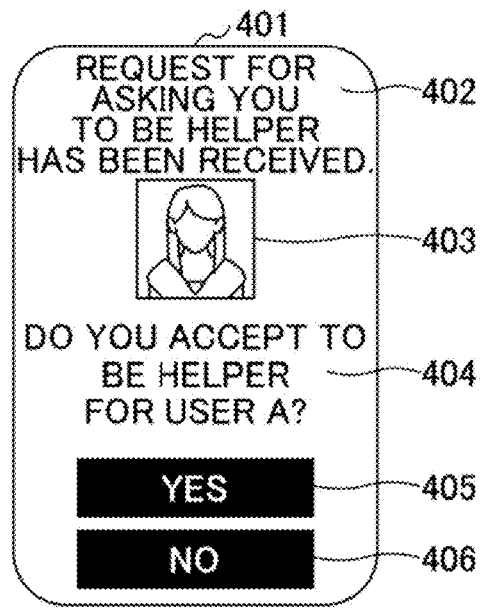
FIG. 4A is a figure for explaining a display screen of a terminal of a user B who is requested to be registered as a helper.
Figure 4B:
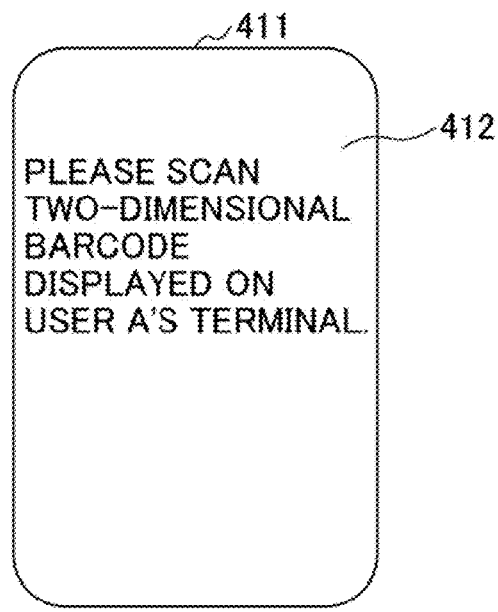
FIG. 4B is a figure for explaining a display screen of the terminal of the user B who is requested to be registered as the helper.
Figure 4C:
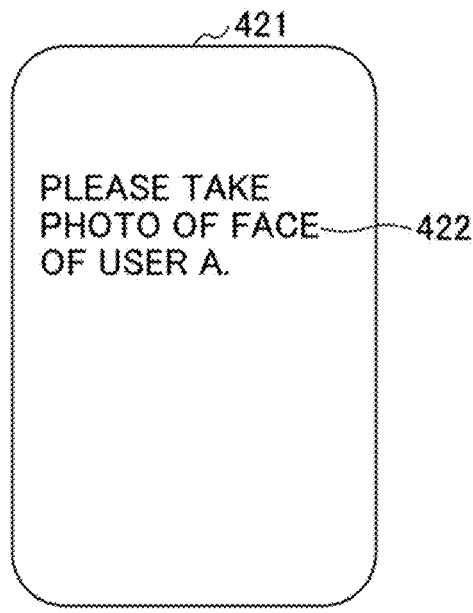
FIG. 4C is a figure for explaining a display screen of the terminal of the user B who is requested to be registered as the helper.
Figure 4D:
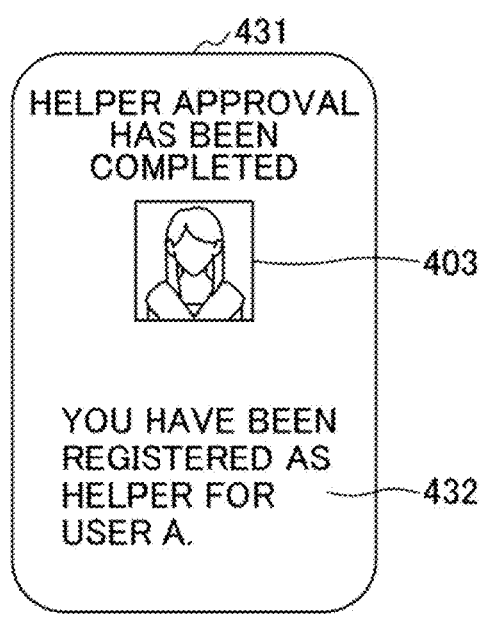
FIG. 4D is a figure for explaining a display screen of the terminal of the user B who is requested to be registered as the helper.

Subsequently, a helper registration process of the communication system 1 is explained with reference to FIG. 2, FIG. 3A to FIG. 3D, and FIG. 4A to FIG. 4D. FIG. 2 is a sequence diagram illustrating an example of a helper registration process of the communication system 1 according to the example embodiments of the present disclosure. FIG. 3A to FIG. 3D are drawings for explaining display screens of the terminal 20A of the user A who requests helper registration. FIG. 4A to FIG. 4D are drawings for explaining display screens of the terminal 20B of the user B who is requested to be registered as a helper.

For example, the user B may be a spouse, a relative, a friend, a colleague, or the like of the user A. Alternatively, the user A and the user B may be users associated with multiple accounts used by the same person. That is, the user A and the user B need only to be users associated with different accounts. Therefore, the user A and the user B can also be referred to as a user associated with an account A (an example of a "first account") and a user associated with an account B (an example of a "second account").

In the description of the helper registration process below, it is assumed that the user A and the user B have logged in to the service such as the SNS provided by the server 10 in advance. Note that, by logging in, the terminal 20 is enabled to use the service.

In operation S101, the receiver 210 of the terminal 20A receives an operation for starting registration of the helper from the user A. In this case, for example, in the display screen 301 of FIG. 3A, the user A taps a "REGISTER HELPER" button 302. Subsequently, the controller 211 of the terminal 20A transmits a request for determining helper candidates to the server 10 (operation S102).

Subsequently, the controller 110 of the server 10 determines candidates of helpers (operation S103). The process for determining the candidates of the helpers will be explained later. Subsequently, the controller 110 of the server 10 transmits information about the candidates of the helpers to the terminal 20A (operation S104).

Subsequently, the display controller 213 of the terminal 20A displays the candidates of the helpers on the screen (operation S105). In this case, for example, in the display screen 311 of FIG. 3B, the terminal 20A displays, in an area 312, a list of icons of users and usernames of the candidates of helpers. It should be noted that an icon 313A and a username 313B are icons and usernames of the user B.

Subsequently, the receiver 210 of the terminal 20A receives, from the user A, an operation for selecting a user, who is to be registered as a helper, from among the candidates (operation S106). In the following explanation, the user B is assumed to be selected on the display screen 311 of FIG. 3B. Subsequently, the controller 211 of the terminal 20A transmits information about the selected user B to the server (operation S107).

Subsequently, the controller 110 of the server 10 generates a token for registering the user B as a helper for the user A (operation S108), and transmits the generated token to the terminal 20A (operation S109). In this case, the token is authentication information that is valid only within a certain period of time (for example, one hour) since it is generated, and includes, for example, information about the user A, the user B, and the like.

Subsequently, the controller 211 of the terminal 20A notifies the information included in the token to another terminal 20B located within a predetermined (or alternately given) range from the terminal 20A (operation S110). In this case, like the display screen 321 of FIG. 3C, the controller 211 of the terminal 20A displays, on a screen, a two-dimensional barcode 322 including the information about the token, so that the token can be read by the terminal 20B located within a predetermined (or alternately given) range (a range in which the two-dimensional barcode 322 can be scanned with a recognizable resolution) from the terminal 20A. Alternatively, the controller 211 of the terminal 20A may transmit the information included in the token from the terminal 20A to the terminal 20B located within the predetermined (or alternately given) range by short-range wireless communication such as Bluetooth, NFC (Near field communication), wireless LAN, infrared communication, and ultrasonic communication. Alternatively, for example, the controller 211 of the terminal 20A may transmit the information included in the token from the terminal 20A to the terminal 20B located within the predetermined (or alternately given) range by communication performed through a cable such as a USB (Universal Serial Bus) cable and the like.

Subsequently, the controller 110 of the server 10 transmits a helper approval request to the terminal 20B of the user B (operation S111).

Subsequently, the display controller 213 of the terminal 20B displays the information included in the helper approval request on the screen (operation S112). In this case, as illustrated in the display screen 401 of FIG. 4A, the display controller 213 of the terminal 20B displays a screen for receiving an approval operation for accepting to become a helper for the user A. The display screen 401 of FIG. 4A includes a message 402 indicating that the user B is requested by the user A to become a helper, the icon 403 of the user A, and a message 404 for asking whether the user B accepts to become a helper for the user A. When a "YES" button 405 is tapped on the display screen 401, the following processing is performed. When a "NO" button 406 is tapped, the user B rejects the helper registration.

Subsequently, the controller 211 of the terminal 20B obtains the token from the terminal 20A in response to the approval operation of the user B (operation S113). In this case, as shown in a display screen 411 of FIG. 4B, the controller 211 of the terminal 20B may display a message 412 for prompting the user B to scan a two-dimensional barcode displayed on the terminal 20A of the user A, and may obtain the token from the two-dimensional barcode captured by the camera in response to the image-capturing operation of the user B. Alternatively, the controller 211 of the terminal 20B may obtain the token from the terminal 20A by short-range wireless communication or communication through a cable directly connecting the terminals.

Subsequently, the receiver 210 of the terminal 20B receives an input operation of the authentication information of the user A (operation S114). In this case, when the controller 211 of the terminal 20B obtains the token from the terminal 20A, the controller 211 causes the display controller 213 to display a message 422 for prompting an input of the authentication information of the user A as shown in a display screen 421 of FIG. 4C. For example, biometric information used for biometric authentication (biometric authentication information) such as a facial image, a fingerprint, voice, and the like of the user A may be input as the authentication information of the user A. Alternatively, for example, a password of the user A for recovery of the account A using a helper, a security question and answer, or the like may be input as the authentication information of the user A. Subsequently, the controller 211 of the terminal 20B stores the received authentication information of the user A (the biometric authentication information, the password, or the like) to the storage device 28 (operation S115). It should be noted that the controller 211 of the terminal 20B may store the authentication information of the user A in the server 10. Subsequently, the controller 211 of the terminal 20B transmits a response indicating the success of the helper approval to the server 10 (operation S116), and causes the display controller 213 to display the success of the helper approval on the screen (operation S117). In this case, as shown in a display screen 431 of FIG. 4D, the controller 211 of the terminal 20B displays a message 432 indicating that the user A is registered as the helper.

Subsequently, the controller 110 of the server 10 transmits a notification indicating the success of the helper registration to the terminal 20A (operation S118). In this case, in the account information 151 as illustrated in FIG. 8 explained later, the controller 110 of the server 10 registers the user ID of the user B in the field of user ID of the helper for the account A of the user A.

Subsequently, the controller 211 of the terminal 20A causes the display controller 213 to display the success of the helper registration (operation S119). In this case, as shown in a display screen 331 of FIG. 3D, the controller 211 of the terminal 20A displays an icon 313A of the user B and a message 332 indicating that the user B is registered as the helper.

<<Process for Determining Helper Candidates>>

Subsequently, the process for determining the candidates of helpers in operation S103 of FIG. 2 is explained.

Also, the controller 110 of the server 10 may determine the candidates of helpers on the basis of closeness of relationship between the user A and another user. In this case, for example, for a higher degree of closeness of relationship with respect to multiple users, the controller 110 of the server 10 may derive a higher score of a likelihood of being a candidate of the helper accordingly.

For example, the controller 110 of the server 10 may determine that the closeness of relationship is relatively high, in a case where the user A and another user live together or work in the same office or in a case where the user A and another user are the same person. In this case, for example, in a case where the IP addresses (an example of "communication address") of the terminals 20 of respective users are the same at a frequency equal to or more than a predetermined (or alternately given) threshold value, the controller 110 of the server 10 may determine that the users live together. This is because the terminals 20 of the respective users are considered to be communicating using a global IP address of a wireless LAN router installed at home. Also, for example, in a case where the positions of the terminals 20 of respective users are the same at a frequency equal to or more than a predetermined (or alternately given) threshold value, the controller 110 of the server 10 may determine that the users live together. In this case, "the positions of the terminals 20 of respective users are the same" means that the difference in the positions between the terminals 20 of respective users is equal to or less than error in position information obtained by the GPS (Global Positioning System) and the like of the terminal 20 and a predetermined (or alternately given) threshold value according to the size of area of an ordinary house.

Also, for example, as the number of users registered as friends by both of the user A and another user (common friends) is relatively high, the controller 110 of the server 10 may determine that the closeness of relationship is relatively high. Also, for example, as a ratio of the number of common friends to the number of all the users registered as friends by the user A and a ratio of the number of common friends to the number of all the users registered as friends by another user become higher, the controller 110 of the server 10 may determine a higher closeness of relationship accordingly.

For example, for a longer period of time the user A and another user being set as friends, the controller 110 of the server 10 may determine a higher closeness of relationship accordingly. In this case, for example, the controller 110 of the server 10 may adopt, as the period of time, a length of time from when one of the user A and another user registers the other as a friend to the current date and time.

For example, for a higher number of times and frequency at which contents are transmitted and received between the user A and another user, the controller 110 of the server 10 may determine a higher closeness of relationship accordingly. For example, for a higher number of times and frequency at which audio calls or video calls are made between the user A and another user, the controller 110 of the server 10 may determine a higher closeness of relationship accordingly.

<Account Recovery Process>

Figure 5B:
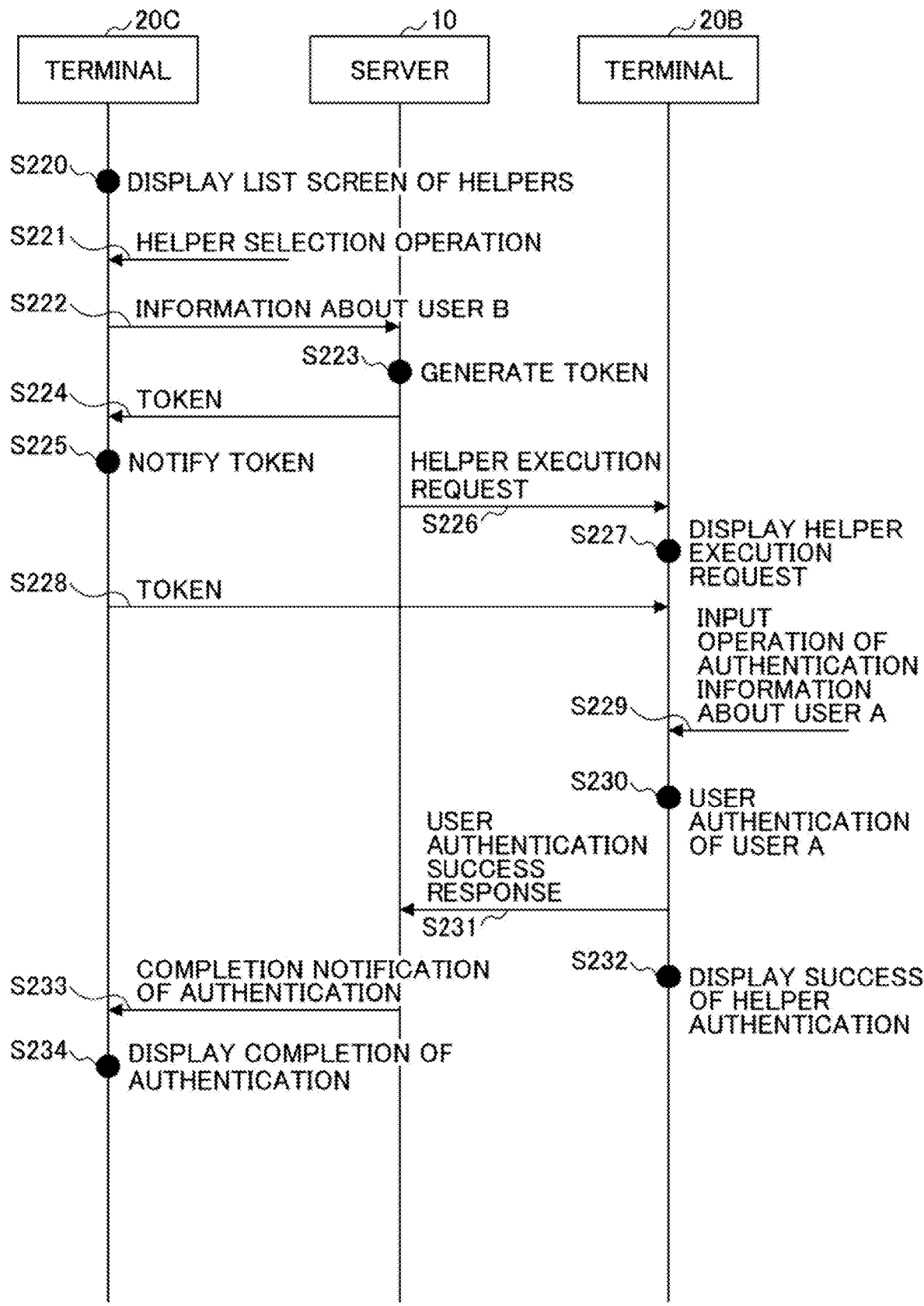
FIG. 5B is a sequence diagram illustrating an example of an account recovery process of the communication system according to the example embodiments of the present disclosure.
Figure 6A:
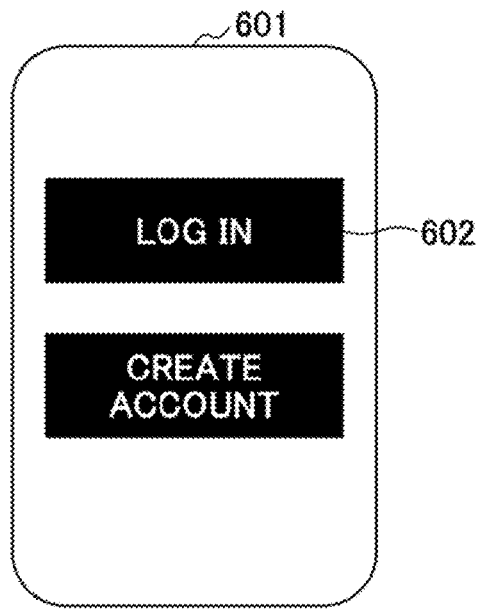
FIG. 6A is a figure for explaining a display screen of the terminal of the user A who requests recovery of the account by using the helper.
Figure 6B:
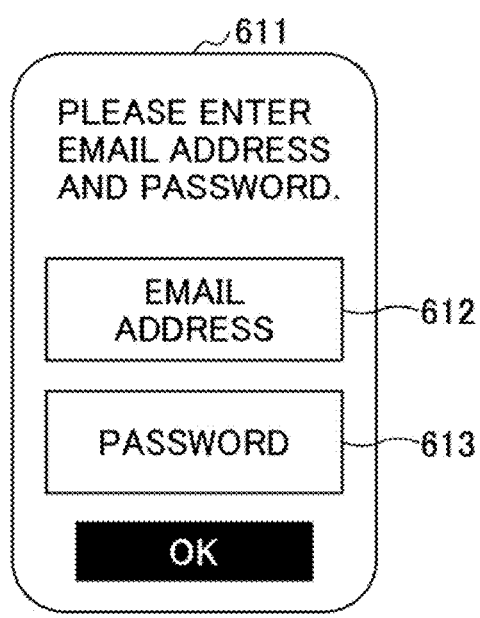
FIG. 6B is a figure for explaining a display screen of the terminal of the user A who requests recovery of the account by using the helper.
Figure 6C:
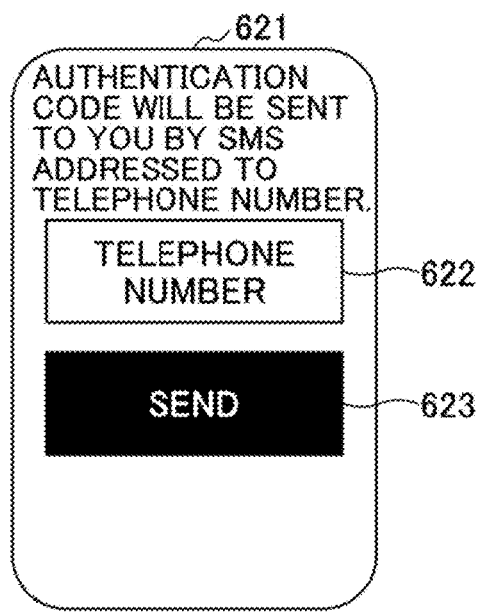
FIG. 6C is a figure for explaining a display screen of the terminal of the user A who requests recovery of the account by using the helper.
Figure 6D:
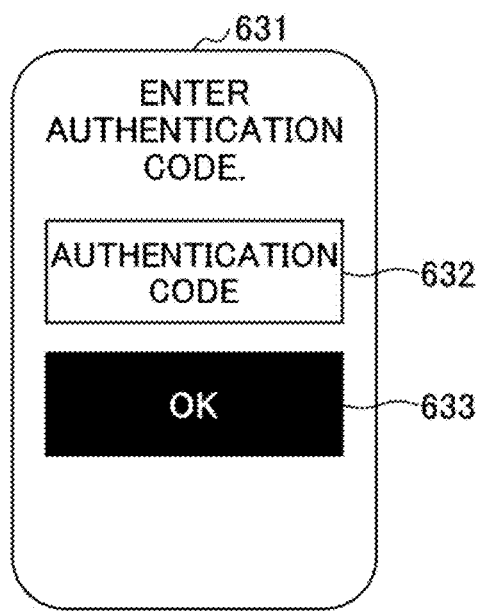
FIG. 6D is a figure for explaining a display screen of the terminal of the user A who requests recovery of the account by using the helper.
Figure 6E:
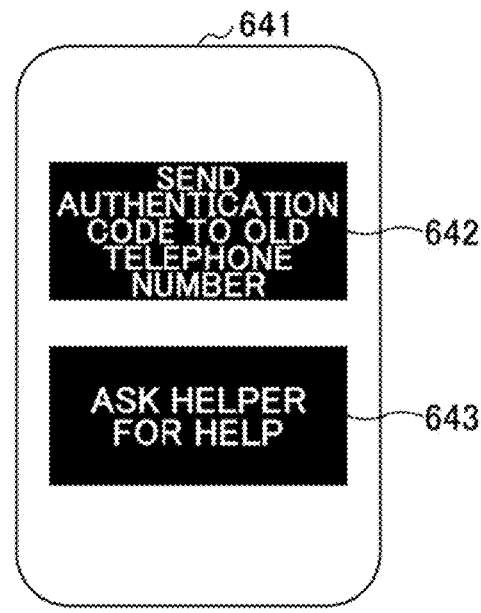
FIG. 6E is a figure for explaining a display screen of the terminal of the user A who requests recovery of the account by using the helper.
Figure 6F:
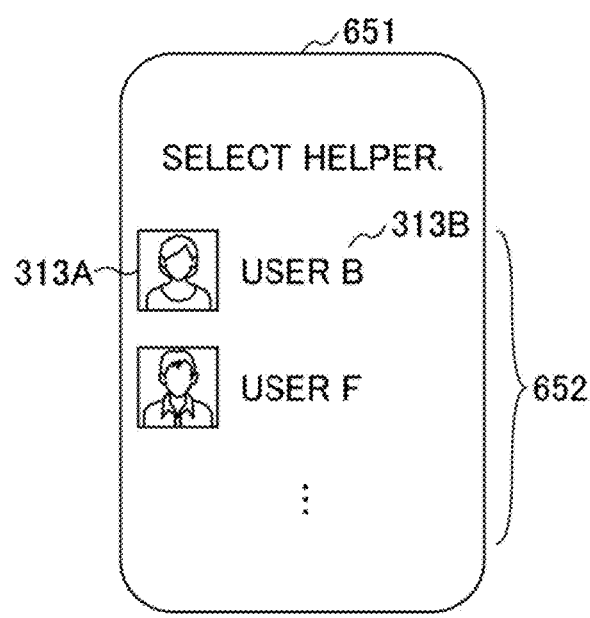
FIG. 6F is a figure for explaining a display screen of the terminal of the user A who requests recovery of the account by using the helper.
Figure 6G:
FIG. 6G is a figure for explaining a display screen of the terminal of the user A who requests recovery of the account by using the helper.
Figure 7A:
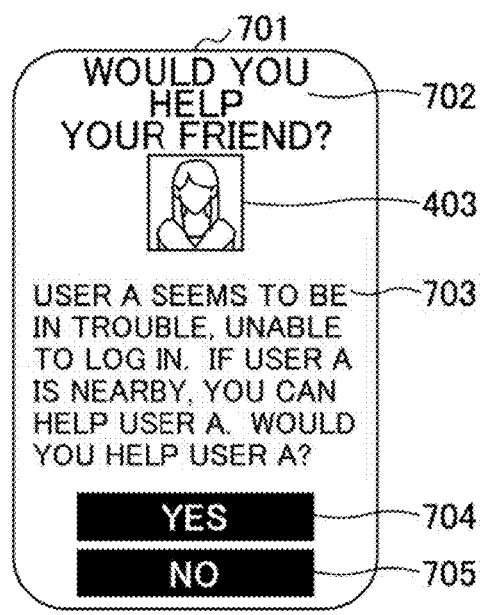
FIG. 7A is a figure for explaining a display screen of the terminal of the user B who is requested to recover the account by using the helper.
Figure 7B:
FIG. 7B is a figure for explaining a display screen of the terminal of the user B who is requested to recover the account by serving as the helper.

Subsequently, an example of an account recovery process of a communication system 1 will be explained with reference to FIG. 5A to FIG. 8. FIG. 5A and FIG. 5B are sequence diagrams illustrating an example of an account recovery process of the communication system 1 according to the example embodiment of the present disclosure. FIG. 6A to FIG. 6G are drawings for explaining display screens on the terminal 20C of the user A who requests recovery of the account by using a helper. FIG. 7A and FIG. 7B are drawings for explaining display screens on the terminal 20B of the user B who is requested to recover the account by serving as the helper. FIG. 8 is a figure illustrating an example of the account information 151 according to the example embodiment of the present disclosure.

As an example of recovery of account, hereinafter explained is a case where, in a system in which logins are performed with two-step authentication, the account A is recovered by transferring the account A of the user A from the terminal 20A (an example of a "first information processing terminal"), i.e., an old terminal having previously been used by the user A, to the terminal 20C (an example of "second information processing terminal"), i.e., a new terminal. For example, the user B is assumed to have already been logged in to the server 10 upon being authenticated by the server 10 through two-step authentication using user authentication based on a password, terminal authentication based on a terminal ID such as a telephone number and the like of the terminal 20, and the like.

In operation S201, the receiver 210 of the terminal 20C receives a login operation from the user A. In this case, for example, on a display screen 601 of FIG. 6A, the user A taps a "LOGIN" button 602. Subsequently, the display controller 213 of the terminal 20C displays a user authentication screen (operation S202). In this case, for example, the display controller 213 of the terminal 20C displays an input field 612 for the ID of the user and an input field 613 for the password on a display screen 611 of FIG. 6B. For example, the ID of the user is information for identifying a user, and may be an email address and the like registered in the server 10 when the user A created the account A in the server 10.

Subsequently, the receiver 210 of the terminal 20C receives, from the user A, an input operation of information for user authentication such as the ID, the password, and the like of the user (operation S203). Subsequently, the controller 110 of the terminal 20C transmits information for user authentication such as the received ID, password, and the like of the user to the server 10 (operation S204).

Subsequently, the controller 110 of the server 10 performs user authentication using the ID and the password of the user (operation S205), and when the controller 110 has successfully passed the user authentication, the controller 110 transmits a response indicating that the controller 110 has successfully passed the user authentication (operation S206). In a case where an account in which the ID of the user is registered does not exist or a password for the ID of the user is wrong, the controller 110 of the server 10 returns an error to the terminal 20C, and does not execute the following processing.

Subsequently, the display controller 213 of the terminal 20C displays a terminal authentication screen (operation S207). In this case, for example, the display controller 213 of the terminal 20C displays an input field 622 for the telephone number of the terminal 20C on a display screen 621 of FIG. 6C. Subsequently, the receiver 210 of the terminal 20C receives, from the user A, an input operation of information for terminal authentication such as the telephone number and the like of the terminal 20C (operation S208). Subsequently, the controller 211 of the terminal 20C transmits the information for the terminal authentication such as the telephone number to the server 10 (operation S209). In this case, for example, in a case where a "TRANSMISSION" button 623 is tapped on the display screen 621 of FIG. 6C, the controller 211 of the terminal 20C transmits the telephone number entered in the input field 622 to the server 10. Subsequently, the display controller 213 of the terminal 20C displays an input screen of an authentication code (operation S210). In this case, for example, the display controller 213 of the terminal 20C displays, on a display screen 631 of FIG. 6D, an input field 632 for an authentication code of the terminal 20C.

Subsequently, the controller 110 of the server 10 generates an authentication code that is valid only for a predetermined (or alternately given) period of time (operation S211), and transmits an SMS message including the authentication code to the telephone number via a network of a cellular company (carrier) (operation S212).

Subsequently, the controller 211 of the terminal 20C receives the SMS message, and causes the SMS message including the authentication code to be displayed on the screen (operation S213). It should be noted that, for example, the function for receiving and displaying the SMS message may be provided by the OS of the terminal 20.

Subsequently, the receiver 210 of the terminal 20C receives an input operation of an authentication code from the user A (operation S214). Subsequently, the controller 211 of the terminal 20C transmits the authentication code received from the user A to the server 10 (operation S215). In this case, for example, when an "OK" button 633 is tapped on a display screen 631 of FIG. 6D, the controller 211 of the terminal 20C transmits the authentication code entered in the input field 632 to the server 10.

Subsequently, in a case where the received authentication code matches the generated authentication code, the controller 110 of the server 10 performs terminal authentication with respect to the account A (operation S216). The account information 151 illustrated in FIG. 8 stores a password, an email address, a telephone number, a terminal ID, a user ID of a helper, a user ID of a friend, a service usage history, and the like, in association with the user ID.

The user ID is identification information for identifying the account of a user. The password is a password used for authentication for login. The email address is an email address of the user. It should be noted that the email address may be used as the user ID. The telephone number is a cellphone number of the terminal 20 of the user. The terminal ID is identification information of the terminal 20 of the user. For example, an IMSI (International Mobile Subscriber Identity), an ICCID (IC Card Identifier), an IMEI (International Mobile Equipment Identity), a MAC address, an ID generated by the OS when the terminal is initialized, a cellphone number, and the like may be used as the terminal IDs. The above terminal IDs may be obtained by an application installed on the terminal 20 with an API (Application Programming Interface) provided by the OS, and may be notified from the terminal 20 to the server 10 when the user logs in to the server 10.

The user IDs of the helpers are user IDs of one or more users registered as the helpers for the user. The user IDs of friends are user IDs of one or more friends registered as friends of the user. The service usage history is, for example, a transmission and reception history of contents such as messages of SMS, a call history, and the like.

In operation S216, the controller 110 of the server 10 determines that the terminal authentication has succeeded in a case where the terminal ID received from the terminal 20C matches the terminal ID of the account A of the user A stored in the account information 151. In a case where the terminal authentication has succeeded, the controller 110 of the server 10 permits the terminal 20C to log in using the account A, so that the terminal 20C can use services such as transmission and reception of contents by SMS. Hereinafter, a case where the terminal authentication has failed (with respect to terminals IDs not matching) is explained.

Subsequently, in a case where the terminal authentication has failed, the controller 110 of the server transmits a response indicating that the terminal authentication has failed to the terminal 20C (operation S217).

Subsequently, the display controller 213 of the terminal 20C displays a selection screen of a recovery method (operation S218). In this case, for example, the display controller 213 of the terminal 20C displays a "SEND AUTHENTICATION CODE TO OLD TELEPHONE NUMBER" button 642, and an "ASK HELPER FOR HELP" button 643 on a display screen 641 of FIG. 6E. Hereinafter, the "ASK HELPER FOR HELP" button 643 is assumed to be tapped.

Subsequently, when the receiver 210 of the terminal 20C receives an operation of the user A for selecting a recovery method using a helper (operation S219), a list screen including one or more users registered as the helpers for the user A is displayed (operation S220). In this case, for example, the display controller 213 of the terminal 20C displays a list of one or more icons of users and usernames registered as helpers in an area 652 on a display screen 651 of FIG. 6F.

Subsequently, the receiver 210 of the terminal 20C receives, from the user A, an operation for selecting a user who is used as the helper (operation S221). In the explanation below, the user B is assumed to be selected on the display screen 651 of FIG. 6F. Subsequently, the controller 211 of the terminal 20C transmits information about the selected user B to the server 10 (operation S222).

Subsequently, the controller 110 of the server 10 generates a token for using the user B as a helper for the user A (operation S223), and transmits the generated token to the terminal 20C (operation S224). In this case, the token is authentication information that is made valid only for a certain period of time (for example, one hour) since the token is generated, and includes, for example, information indicating, e.g., the user A, the user B, and the like.

Subsequently, the controller 211 of the terminal 20C notifies the information included in the token to another terminal 20B located within a predetermined (or alternately given) range from the terminal 20C (operation S225). In this case, the controller 211 of the terminal 20C may display a display screen similar to the display screen 321 of FIG. 3C to display a two-dimensional barcode including information about the token on a screen, so that the token can be scanned by the terminal 20B located within the predetermined (or alternately given) range from the terminal 20C.

Alternatively, the controller 211 of the terminal 20C may transmit the information included in the token from the terminal 20C to the terminal 20B located within the predetermined (or alternately given) range by short-range wireless communication such as Bluetooth, NFC (Near field communication), wireless LAN, infrared communication, and ultrasonic communication. Alternatively, for example, the controller 211 of the terminal 20C may transmit the information included in the token to the terminal 20B located within the predetermined (or alternately given) range from the terminal 20C by communication performed through a cable such as a USB (Universal Serial Bus) cable and the like.

Subsequently, the controller 110 of the server 10 transmits a helper execution request to the terminal 20B of the user B (operation S226).

Subsequently, the display controller 213 of the terminal 20B displays information included in the helper execution request on a screen (operation S227). In this case, as shown in a display screen 701 of FIG. 7A, the display controller 213 of the terminal 20B displays a screen for receiving an approval operation for helping recovery of the account A of the user A. The display screen 701 of FIG. 7A includes a message 702 indicating that the user A is asking for help in account recovery, an icon 403 of the user A, and a message 703 for confirming whether the user B is going to help the account recovery of the user A. When a "YES" button 704 is tapped on the display screen 701, the following processing is performed. When a "NO" button 705 is tapped, the user B rejects execution of the helper.

Subsequently, the controller 211 of the terminal 20B obtains the token from the terminal 20C in response to the approval operation of the user B (operation S228). In this case, as shown in the display screen 411 of FIG. 4B, the controller 211 of the terminal 20B may display a message 412 for prompting the user B to scan a two-dimensional barcode displayed on the terminal 20C of the user A, and may obtain the token from the two-dimensional barcode captured with the camera in response to the image-capturing operation of the user B. Alternatively, the controller 211 of the terminal 20B obtains the token from the terminal 20C by short-range wireless communication or communication through a cable directly connecting the terminals.

Subsequently, the receiver 210 of the terminal 20B receives an input operation of the authentication information of the user A (operation S229). In this case, when the controller 211 of the terminal 20B obtains the token from the terminal 20C, the controller 211 displays a message 422 for prompting an input of the authentication information of the user A as shown in the display screen 421 of FIG. 4C. For example, biometric information used for biometric authentication such as a facial image, a fingerprint, voice, and the like of the user A may be input as the authentication information of the user A. Alternatively, for example, a password of the user A for recovery of the account A using a helper, a security question and answer, or the like may be input as the authentication information of the user A. Subsequently, the controller 211 of the terminal 20B performs the user authentication of the user A by collating the authentication information of the user A received in the processing of operation S218 with the authentication information of the user A saved in the processing of operation S115 of FIG. 2 (operation S230).

Subsequently, in a case where the user authentication of the user A has succeeded, the controller 211 of the terminal 20B transmits a response of success in the user authentication to the server 10 (operation S231), and displays a message indicating the success in the user authentication using the helper on the screen (operation S232). It should be noted that the response of success in the user authentication may include the information about the token. In this case, as shown in the display screen 711 of FIG. 7B, the terminal 20B displays a message 432 indicating that the authentication has succeeded, and the account A of the user A has been recovered.

Subsequently, when the controller 110 of the server receives the response of success in the user authentication from the terminal 20B, the controller 110 transmits a notification indicating the success of the helper authentication to the terminal 20C (operation S233). In this case, in the account information 151 as illustrated in FIG. 8, the controller 110 of the server 10 may change the terminal ID of the user A from the terminal ID of the terminal 20A to the terminal ID of the terminal 20C. Accordingly, in a case where the account A is transferred from the terminal 20A to the terminal 20C, this change of the terminal ID will disable future logins by the terminal 20A.

Subsequently, the display controller 213 of the terminal 20C displays success of helper authentication on the screen (operation S234). In this case, as shown in a display screen 661 of FIG. 6G, the display controller 213 of the terminal 20C displays a message 662 indicating that the account A has been recovered.

Modified Example Embodiment 1

In the example explained above, the case where, in a system in which logins are performed with two-step authentication, the account A of the user A was transferred using the helper from the terminal 20A, i.e., an old terminal having been previously used by the user A, to the terminal 20C, i.e., a new terminal was explained as an example of recovery of an account. Alternatively, the account recovery process using the helper as described above may be performed in a system in which authentication is performed based on a user ID, a password, and the like. In this case, for example, the account A can be recovered even in a case where the email address registered in advance for resetting the password of the account A cannot be accessed.

Modified Example Embodiment 2

In the example explained above, an example embodiment in which a single user is to be used as a helper has been explained as an example of helper registration. Alternatively, multiple helpers may be registered, and the account recovery may be permitted only in a case where authentications with all the helpers are successfully passed. Still alternatively, multiple helpers may be registered, and the account recovery may be permitted only in a case where authentications with a certain number of helpers or a certain ratio of helpers are confirmed.

Effects of Example Embodiments

According to the example embodiments explained above, a situation where a user cannot log in with the account of the user can be reduced or prevented. In addition, according to the example embodiments explained above, an increase of data of accounts to which users cannot log in the server 10 can be reduced or prevented, and therefore, there is an effect in that the load of the server 10 can be alleviated as a result.

Although the example embodiments of the present disclosure have been described with reference to drawings and examples, it should be noted that those skilled in the art can easily make various changes and modifications based on the present disclosure. Therefore, it should be noted that these changes and modifications are included in the scope of the present disclosure. By way of example and not limitation, the functions included in each means, each operation, and the like can be rearranged so as not to logically contradict, and multiple means, operations, and the like can be combined into one or divided. Further, the configurations shown in the respective example embodiments may be combined as appropriate. It should be noted that the controller 110 is an example of a "managing unit", a "registering unit", and a "permitting unit". The controller 211 is an example of a "registering unit" and a "permitting unit".

What is claimed is:

1. A non-transitory computer-readable recording medium having computer-readable instructions stored thereon, which when executed, cause an information processing apparatus including a memory and processing circuitry, to execute a method comprising: managing a first account and a second account for a service provided by the information processing apparatus; determining, by the processing circuitry in response to a request from a first information processing terminal corresponding to a first user corresponding to the first account, candidates of users capable of recovering the first account, the candidates of users capable of recovering the first account being different from the first user; registering a second user corresponding to the second account as a user capable of recovering the first account, in response to receiving a request from the first information processing terminal;

determining whether authentication is successful based on authentication information of the first user received from a second information processing terminal corresponding to the second user;

and providing the first user access to the service based on the determination, wherein the determining the candidates of the users further comprises determining the candidates of the users based on at east one of: a number of users registered as being in a relationship by both of the first user and the second user; a period of time for which the first user and the second user are registered as being in the relationship; a frequency at which a content is transmitted between the first user and the second user: a frequency at which a communication address of the first information processing terminal and a communication address of the second information processing terminal match each other; or a frequency at which a position of the first information processing terminal and a position of the second information processing terminal match each other.

2. The method according to claim 1, wherein the second information processing terminal is within a given range from the first information processing terminal.

3. The method according to claim 2, wherein the determining whether the authentication is successful is based on biometric information of the first user received from the second information processing terminal.

4. The method according to claim 1, wherein the providing the first user access further comprises: authenticating the first user based on identification information of the first information processing terminal associated with the first account; and providing the first user access to the service via a third information processing terminal in response to the identification information of the first information processing terminal and identification information of the third information processing terminal being different, and successful authentication based on the authentication information of the first user received from the second information processing terminal.

5. The method according to claim 1, wherein the registering the second user further comprises: registering the second user as the user capable of recovering the first account, in response to receiving a request from the first information processing terminal and a request from the second information processing terminal located within a given range from the first information processing terminal.

6. The method according to claim 1, wherein the determining candidates of users capable of recovering the first account includes determining the candidates of users capable of recovering the first account in accordance with a closeness of relationship between the first user and users of other accounts, wherein the second user is selected from among the candidates of the users.

7. The method according to claim 1, further comprising: generating a token for registering the second user as a user capable of recovering the first account; and transmitting the token to the first information processing terminal.

8. The method according to claim 7, wherein the token is a two-dimensional barcode.

9. An information processing apparatus comprising: a memory storing computer-readable instructions; and processing circuitry the computer-readable instructions and the processing circuitry configured to cause the information processing apparatus to, manage a first account and a second account for a service provided by the information processing apparatus; determine, by the processing circuitry in response to a request from a first information processing terminal corresponding to a first user corresponding to the first account, candidates of users capable of recovering the first account, the candidates of users being different from the first user; register a second user corresponding to the second account as a user capable of recovering the first account, in response to receiving a request from the first information processing terminal; determine whether authentication is successful based on authentication information of the first user received from a second information processing terminal corresponding to the second user; and provide the first user access to the service based on the determination, Wherein the determining the candidates of the users further comprises determining the candidates of the users based on at least one of: a number of users registered as being in a relationship by both of the first user and the second user; a period of time for which the first user and the second user are registered as being in the relationship; a frequency at which a content is transmitted between the first user and the second user; a frequency at which a communication address of the first information processing terminal and a communication address of the second information processing terminal match each other; or a frequency at which a position of the first information processing terminal and a position of the second information processing terminal match each other.

10. A non-transitory computer-readable recording medium having computer-readable instructions stored thereon, which when executed, cause an information processing terminal that includes a memory and processing circuitry, to execute a method comprising: receiving a first request of a first user corresponding to a first account of a service provided by an information processing apparatus connected via a network; determining, by the processing circuitry in response to a request from a first information processing terminal corresponding to a first user corresponding to the first account, candidates of users capable of recovering the first account, the candidates of users capable of recovering the first account being different from the first first user; receiving a second request of the first user via the network;

and registering a second user corresponding to a second account as a user capable, of recovering the first account in response to the second request, wherein the second user is capable of recovering the first account in response to authentication being successfully performed based on authentication information of the first user corresponding to the first account entered to the information processing terminal, and wherein the determining the candidates of the users further comprises determining the candidates of the users based on at least one of: a number of users registered as being in a relationship by both of the first user and the second user; a period of time for which the first user and the second user are registered as being in the relationship; a frequency at which a content is transmitted between the first user and the second user; a frequency at Which a communication address of the first information processing terminal and a communication address of the second information processing terminal corresponding to the second user match each other; or a frequency at which a position of the first information processing terminal and a position of the second information processing terminal match each other.

11. An information processing terminal comprising: a memory storing reading computer-readable instructions; and processing circuitry, the computer-readable instructions and the processing circuitry configured to cause the information, processing, terminal to, receive a first request of a first user corresponding to a first account of a service provided by an information processing apparatus connected via a network; determine, by the processing circuitry in response to the first request, candidates of users capable of recovering the first account, the candidates of users capable of recovering the first account being different from the first user; receive a second request of the first user via the network; and register a second user corresponding to a second account as a user capable of recovering the first account, wherein the second user is capable of recovering the first account in response to authentication being' successfully performed based on authentication information of the first user corresponding to the first account entered to the information processing terminal, and wherein the determining the candidates of the users further comprises determining the candidates of the users based on at least one of: a number of users registered as being in a relationship by both of the first user and the second user; a period of time for which the first user and the second user are registered as being in the relationship; a frequency at which a content is transmitted between the first user and the second user: a frequency at which a communication address of the first information processing terminal and a communication address of the second information processing terminal match each other; or a frequency at which a position of the first information processing terminal and a position of the second information processing terminal match each other.

12. An information processing method for an information processing terminal, the method comprising: receiving a first request of a first user corresponding to a first account of a service provided by an information processing apparatus connected via a network; determining by the processing circuity in response to the first request, candidates of users capable of recovering the first account, the candidates of users capable of recovering the first account being different from the first user; receiving a second request of the first user; registering a second user corresponding to a second account as a user capable of recovering the first account in response to the second request; and causing the information processing apparatus to permit the first user corresponding, to the first account to log, in, in response to determining that authentication is successful based on authentication information of the first user entered to the information processing terminal, wherein the determining the candidates of the users further comprises determining the candidates of the users based on at least one of: a number of users registered as being in a relationship by both of the first user and the second user; a period of time for which the first user and the second user are registered as being in the relationship; a frequency at which a content is transmitted between the first user and the second user; a frequency at which a communication address of the first information processing terminal and a communication address of a second information processing terminal corresponding to the second user match each other; or a frequency at which a position of the first information processing terminal and a position of the second information processing terminal match each other.

* * * * *